Patented Nov. 16, 1943

2,334,199

UNITED STATES PATENT OFFICE 2,334,199

PROCESS OF TREATING TEXTILE MATERIALS

Harley Y. Jennings, Flint, Mich., assignor to Copeman Laboratories Company, Flint, Mich., a corporation of Michigan No Drawing. Application August 5, 1939, Serial No. 288,588

6 Claims. (Cl. 117—161)

This invention relates to processes of treating textile materials and particularly to the art of coloring textile fibers and objects made from such fibers.

The invention contemplates the fixing or setting of a dye-stuff on a fabric or textile material by means of a water-insoluble resinous substance which substance is dissolved in a suitable solvent. The dyestuff used may likewise be soluble in the solvent for the resin or it may comprise an insoluble pigment, but in any event it should be water-insoluble.

In order to insure a maximum degree of penetration and to use a minimum amount of solvent, the invention contemplates the formation of an oil-in-water emulsion in which a solvent containing dissolved resin and coloring matter constitutes the inside or disperse phase. In order to form an emulsion of this type, the solvent used should be insoluble in water.

A sufficient quantity of water is used to make the emulsion relatively thin, so that the fabric or other material to be dyed may be passed through a padding bath comprising the oil-in-water emulson. In passing through the bath the fabric, because it is more readily wet by the organic solvent than by the water, is penetrated by the solvent droplets containing the dissolved resinous substance and coloring matter and is then dried, leaving a film of coloring matter and resinous substance around the individual fibers which comprise the textile material. The resinous substance serves not only to bind the coloring matter to the fibers in a smooth substantially continuous film, but also serves as a finish for the treated material, so that I accomplish the usual dyeing and finishing steps in a single operation with a resultant saving in time and labor.

By a judicious selection of resins the finish so applied may be permanent as regards washing and dry cleaning with the usual solvents, and may also impart added wear to the fabric, by offering an additional surface against abrasive wear.

Typical resins which may be used in carrying out the invention comprise polymerized tung oil, polymerized linseed oil, ester gums, "Amberol" and glyptal resins. The water-insoluble dyestuffs may comprise oil-soluble dyes such as Alizarine Cyanine Green, made by the General Dyestuff Corporation of New York, Pylakrome Green LX-1014, made by the Pylam Products Co. of New York, du Pont Oil Black B. G. made by E. I. du Pont and Company of Wilmington, Delaware, and Oil Blue M made by Ciba Co., Inc., of New York.

Suitable water-insoluble solvents may be selected from the group of hydrocarbons such as benzene, or the chlorinated solvents such as carbon tetrachloride. Resins soluble in the solvents ordinarily used in dry-cleaning, such as carbon tetrachloride, should not be used in cases where the treated and dyed material may be subjected to dry-cleaning.

In carrying out my process, the following general steps are observed.

(1) The water-insoluble resinous substance is dissolved in the organic solvent.

(2) The coloring matter is added to the resin solution.

(3) The resin solution containing the coloring matter is dispersed in the form of minute globules as the disperse phase of an oil-in-water emulsion. This emulsification may be aided by the addition of a small amount of a dispersing agent such as ammonium stearate.

(4) The material to be treated is padded through the emulsion where the organic droplets are adsorbed by the material being treated because of the inherent affinity of organic solvents for such materials as compared with water.

(5) The treated material, after being drawn through the padder is dried, preferably under tension, and preferably with the application of heat, to form a colored coating on the individual fibers of the material.

As both the resinous substances and the coloring matter are water-insoluble, the treated material may be subjected to repeated washings without affecting the "hand" or appearance of the material. The coloring matter, bound to the material by or as a part of the dry film of resinous substances, is fast and permanent.

Example I

A resinous solution was made of the following substances and in substantially the following parts by weight:

| | Parts |
|---|---|
| Amberol F7 | 220 |
| Castor oil | 55 |
| Tung oil | 55 |
| Stearic acid | 1.8 |
| Toluol | 308 |
| Carbon tetrachloride | 284 |

This solution was prepared in the following manner: the castor and tung oils were mixed and heated at approximately 420 degrees F. until the mixture started to gel or thicken. This took approximately five and one-half hours. Then the Amberol F7, which had been melted, was added. The temperature of the mix was then raised to approximately 525 degrees F., when the heat was shut off and the mixture allowed to cool. When a temperature of approximately 325 degrees F. was reached the stearic acid was added with constant stirring. When the temperature had fallen below 300 degrees F. the toluol and carbon tetrachloride were slowly added successively with constant stirring.

A dyeing and finishing emulsion was prepared in the following manner: six ounces of Pylakrome Oil Green LX-1014 was dissolved in three pints of the above-described resinous solution. A mixture of one and one-half pints of commercial ammonia water (to assist in emulsification) was mixed thoroughly with seven and one-half pints of water. The dye-in-oil solution was then added slowly, and with vigorous stirring to the water containing the ammonia. The resultant product was an oil-in-water emulsion in which the coloring matter and resinous substance was dissolved in fine droplets of organic solvent with the droplets highly dispersed in the aqueous medium.

The textile material to be treated was run through the emulsion and then dried. The fine droplets of organic solvents containing coloring matter and resinous substance readily wet the surface of the fibers, and enter the microscopic spaces of the fibers, carrying the coloring matter and resinous material with them. This was due to the high affinity of the solvents for the textile fibers as well as the lower surface tension of the organic solvents as compared with that of the outer phase, water. When the treated textile material was dried the organic solvent evaporated leaving a substantially continuous film of resinous substance containing the coloring matter adhering to the surface of the fibers and filling many of the minute and microscopic spaces that exist on these surfaces. Thus, the resinous film served the double purpose of securely binding the coloring matter to the textile fibers to produce a permanent dyeing effect, and at the same time imparted added wear resistance and tensile strength to the treated and dyed material. Generally speaking, this resinous film will bind together the individual fibers at their points of contact and thus increase the inherent strength of the treated material, but because the emulsion is relatively thin it will not materially affect the natural porosity of the textile material by filling the interstices between the individual threads forming the material, as would be the case if the emulsion was heavy and viscous and merely lay on the surface of the material without substantially penetrating the fibrous structure.

*Example II*

A resinous solution was prepared in the same manner as that in the preceding example, but using the following proportions:

| | | |
|---|---|---|
| Tung oil | grams | 1½ |
| Castor oil | do | 1½ |
| Amberol | do | 27 |
| Stearic acid | do | 1 |
| Benzene | cc | 30 |
| Carbon tetrachloride | cc | 15 |

To this solution was added 60 mg. of Oil Blue M made by Ciba Co., Inc., of New York. This was then dispersed in 300 cc. of water containing 3 cc. of commercial ammonia. Indian Head muslin was passed through this emulsion and was thereby simultaneously dyed and finished as described in Example I.

In general, the method of treating textile materials according to my process is as follows:

The aqueous emulsion is placed in a tank such as is used in a regular padding machine. The textile or porous material is drawn through this aqueous emulsion and run through regular padding rolls under pressure which serve to squeeze the liquid into the minute spaces formed between the fibers of the textile material, and also serve to remove excess emulsion from the material being treated. The treated material is then dried as by passing over heated cans or stretched on tenter frames such as are used in the textile industry. Water and any other volatile liquids which may be present are thus removed and the material is left in an essentially dry condition.

It will thus be seen that I have provided an extremely simple and inexpensive method of dyeing and finishing textile materials by applying water-insoluble resinous substances, together with coloring matter, to the fibers. Only a small amount of organic solvent is required, the amount being so small as to make it unnecessary to utilize any recovery apparatus or any other than ordinary ventilating equipment. No subsequent chemical reaction is necessary, because the finely dispersed resinous substances are already in a water-insoluble form.

Regardless of the method in which my coating material is prepared, the essential point is that the water-insoluble resinous substances, together with coloring matter, are held in fine droplets of organic liquid highly and uniformly dispersed in the aqueous medium. Thus, in all preferred processes of preparing the treating emulsion, only a very small amount of organic liquid is used and the resinous substances are highly dispersed in the aqueous medium as water-insoluble substances, which may be directly applied to the goods without after-treatment. The small fine droplets in suspension consisting of resinous substance and coloring matter and organic liquid have a preferential adsorption for fibers; in other words, by leaving the small amount of organic liquid droplets containing the dissolved resinous substance and coloring matter in suspension, such droplets will be preferentially adsorbed by the fibers. It will be obvious that this preferential adsorption materially assists in obtaining a coating for each thread or fiber so thin as not to appreciably change the porosity of the fabric. When the fabric to be treated is drawn through the emulsion consisting of very fine droplets of organic liquid containing the dissolved (water-insoluble) resin and coloring matter, the organic liquid in the form of the very fine droplets has a high affinity for the textile material and is adsorbed by it. In this way the extremely fine particles of resinous substance and coloring matter are drawn to the fibers and tend to cover each fiber. When the fabric is removed from the emulsion it is allowed to dry and in the drying process both the water and the organic liquid which surround the fibers escape, leaving the resin and coloring matter in contact with the fibers.

I claim:

1. The art of pad dyeing to produce a solid color effect which comprises subjecting textile materials having discrete fibers to an emulsion comprising fine droplets of organic solvent uniformly dispersed in an aqueous medium, the individual droplets having dissolved therein a resinous substance containing coloring matter, and then drying the textile material to form a product comprising textile material having coloring matter bonded to its discrete fibers by a substantially continuous film of resinous substance.

2. A solid-colored textile material comprising a fabric having discrete fibers, and means substantially covering the discrete fibers to color the same, said means comprising a thin substantially continuous film of resinous substance containing coloring matter, the material being, to the naked eye, of a uniform color and appearance, substantially identical with the product of claim 4.

3. The art of treating textile materials having discrete fibers which comprises dissolving a water-insoluble resinous substance and an oil-soluble dye in a volatile organic solvent, incorporating in such solution water to produce a relatively fine oil-in-water type emulsion in which the tiny droplets of organic solvent containing dissolved resinous substances and dye comprise the disperse phase, the consistency of the solution being such that the liquid will enter the capillary spaces of the textile material, subjecting the material to said emulsion whereby the droplets of organic solvent containing dissolved resinous substance and dye are adsorbed by the textile material due to the high affinity of the organic solvent for the textile material, and then evaporating the organic solvent to leave the resinous substance and dye as a thin film on the discrete fibers of the textile material.

4. The art of treating porous textile materials having discrete fibers comprising as a step, applying to discrete fibers of the structural yarns of the fabric an aqueous dispersion of water-insoluble resin, water-insoluble coloring matter and water-insoluble organic solvent for the resin, the consistency of the dispersion being so thin as to leave said interstices open, the organic solvent being of a nature as to carry the dispersed resins and coloring matter into the capillary spaces of the material, and drying the materal to leave a thin coating of resin and coloring matter around the discrete fibers without materially affecting the porosity of the material.

5. The method of dyeing porous textile materials having discrete fibers which comprises applying to the material coloring matter emulsified with a solvent and a resin in water, the emulsion being so thin that the droplets of solvent containing coloring matter and resin are carried into the discrete fibers of the material, and then drying the material to deposit a thin film of resin containing coloring matter on the discrete fibers of the material without materially affecting the porosity thereof.

6. The art of treating porous textile materials having discrete fibers comprising, as a step, applying to discrete fibers of the structural yarns of the fabric an aqueous dispersion of water-insoluble resin, water-insoluble coloring matter and water-insoluble organic solvent for the resin, said dispersion comprising a volatile content of at least 80% by weight and being of such thinness as to provide a relatively fine oil-in-water emulsion in which the tiny droplets of organic solvent containing the water-insoluble resin and water insoluble coloring matter comprising the disperse phase, the consistency of the emulsion being such that the liquid will enter the capillary spaces of the textile material, whereby the droplets of organic solvent containing dissolved water-insoluble resin and water-insoluble coloring matter are adsorbed by the textile material due to the high affinity of the organic solvent for the textile material, and drying the material to leave a thin coating of resin and coloring matter on the discrete fibers of the material without materially affecting its porosity.

HARLEY Y. JENNINGS.